United States Patent
Ramanathan et al.

(10) Patent No.: US 11,863,426 B2
(45) Date of Patent: Jan. 2, 2024

(54) DETERMINING A BEST DESTINATION OVER A BEST PATH USING MULTIFACTOR PATH SELECTION

(71) Applicant: Juniper Networks, Inc., Sunnyvale, CA (US)

(72) Inventors: Sai Prashanth Ramanathan, Bangalore (IN); Antony Ruban Alexis, Bangalore (IN); Abdul Kadhar Jeelany Habeeb Mohamed, Chennai (IN); Hemachandran Karnam Mohan, Chittoor (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/679,366

(22) Filed: Feb. 24, 2022

(65) Prior Publication Data
US 2023/0269172 A1    Aug. 24, 2023

(51) Int. Cl.
*H04L 45/00* (2022.01)
*H04L 45/745* (2022.01)

(52) U.S. Cl.
CPC ............ *H04L 45/14* (2013.01); *H04L 45/745* (2013.01)

(58) Field of Classification Search
CPC .............................. H04L 45/14; H04L 45/745
See application file for complete search history.

(56) References Cited

U.S. PATENT DOCUMENTS

| | | | |
|---|---|---|---|
| 10,033,805 B1 | 7/2018 | Mutnuru | |
| 10,484,925 B1 * | 11/2019 | Chen | ..................... H04W 40/16 |
| 10,588,069 B1 * | 3/2020 | Chen | ..................... H04L 45/26 |
| 11,128,597 B1 * | 9/2021 | Johnson | ................. H04L 9/0643 |
| 2008/0267088 A1 * | 10/2008 | Dunbar | .................... H04L 45/64 370/254 |
| 2011/0264781 A1 * | 10/2011 | Moser | ................. H04L 61/4523 709/223 |
| 2012/0079055 A1 * | 3/2012 | Robinson | ............ H04L 61/4511 709/213 |

(Continued)

FOREIGN PATENT DOCUMENTS

WO    2008134947 A1    11/2008

OTHER PUBLICATIONS

Extended European Search Report for Application No. 2177380.7, dated Nov. 3, 2022, 11 pages.

*Primary Examiner* — Oleg Survillo
*Assistant Examiner* — Monishwar Mohan
(74) *Attorney, Agent, or Firm* — Harrity & Harrity, LLP

(57) ABSTRACT

A network device may receive a request for a service from an endpoint device located in a first region, and may determine whether destination addresses are identified for the service and the first region. The network device may determine whether the service and the first region are identified in a lookup table, and may receive performance metrics associated with multiple paths in the first region to the destination addresses, based on the service and the first region not being identified in the lookup table. The network device may generate a performance metrics matrix based on the performance metrics, and may identify a best destination and a best path for the service in the first region based on the performance metrics matrix, and may cause, for the endpoint device, a connection to the service to be established via the best destination and the best path for the first region.

20 Claims, 15 Drawing Sheets

(56) References Cited

U.S. PATENT DOCUMENTS

| | | | |
|---|---|---|---|
| 2018/0084040 A1* | 3/2018 | Moreau | H04L 67/025 |
| 2019/0104413 A1 | 4/2019 | Cidon et al. | |
| 2019/0386918 A1 | 12/2019 | Iyer et al. | |
| 2020/0007421 A1* | 1/2020 | Bridges | H04L 43/0876 |
| 2020/0120408 A1* | 4/2020 | Boyd | H04L 41/0886 |
| 2020/0136943 A1 | 4/2020 | Banyai et al. | |
| 2022/0394362 A1* | 12/2022 | Michelogiannakis | H04L 41/0806 |

* cited by examiner

DETERMINING A BEST DESTINATION OVER A BEST PATH USING MULTIFACTOR PATH SELECTION

BACKGROUND

A user may utilize an endpoint device to access a service hosted by a variety of cloud service providers. Each of the cloud service providers may provide several server devices at different geographical regions to host the service.

SUMMARY

Some implementations described herein relate to a method. The method may include receiving a request for a service from an endpoint device located in a first region, and determining whether destination addresses are identified for the service and the first region. The method may include determining whether the service and the first region are identified in a multifactor path selection (MFPS) lookup table, based on the destination addresses being identified for the service and the first region, and receiving performance metrics associated with multiple paths in the first region to the destination addresses, based on the service and the first region not being identified in the MFPS lookup table. The method may include generating a performance metrics matrix based on the performance metrics, and identifying a best destination and a best path, and a next best destination and a next best path, for the service in the first region based on the performance metrics matrix. The method may include providing data identifying the best destination, the best path, the next best destination, and the next best path, for the first region, in the MFPS lookup table, and causing, for the endpoint device, a connection to the service to be established via the best destination and the best path for the first region.

Some implementations described herein relate to a network device. The network device may include one or more memories and one or more processors. The one or more processors may be configured to receive a request for a service from an endpoint device located in a first region, and determine whether destination addresses are identified for the service and the first region. The one or more processors may be configured to determine whether the service and the first region are identified in an MFPS lookup table, based on the destination addresses being identified for the service and the first region, and receive performance metrics associated with multiple paths in the first region to the destination addresses, based on the service and the first region not being identified in the MFPS lookup table. The one or more processors may be configured to generate a performance metrics matrix based on the performance metrics, and identify a best destination and a best path, and a next best destination and a next best path, for the service in the first region based on the performance metrics matrix. The one or more processors may be configured to provide data identifying the best destination, the best path, the next best destination, and the next best path, for the first region, in the MFPS lookup table.

Some implementations described herein relate to a non-transitory computer-readable medium that stores a set of instructions for a network device. The set of instructions, when executed by one or more processors of the network device, may cause the network device to receive a request for a service from an endpoint device located in a first region, and determine whether destination addresses are identified for the service and the first region. The set of instructions, when executed by one or more processors of the network device, may cause the network device to determine whether the service and the first region are identified in an MFPS lookup table, based on the destination addresses being identified for the service and the first region, and receive performance metrics associated with multiple paths in the first region to the destination addresses, based on the service and the first region not being identified in the MFPS lookup table. The set of instructions, when executed by one or more processors of the network device, may cause the network device to generate a performance metrics matrix based on the performance metrics, and identify a best destination and a best path, and a next best destination and a next best path, for the service in the first region based on the performance metrics matrix. The set of instructions, when executed by one or more processors of the network device, may cause the network device to provide data identifying the best destination, the best path, the next best destination, and the next best path, for the first region, in the MFPS lookup table, and cause the network device to determine that the best destination or the best path for the first region is unavailable. The set of instructions, when executed by one or more processors of the network device, may cause the network device to cause, for the endpoint device, a connection to the service to be established via the next best destination and the next best path for the first region based on determining that the best destination or the best path for the first region is unavailable.

DETAILED DESCRIPTION

Figure 1A:
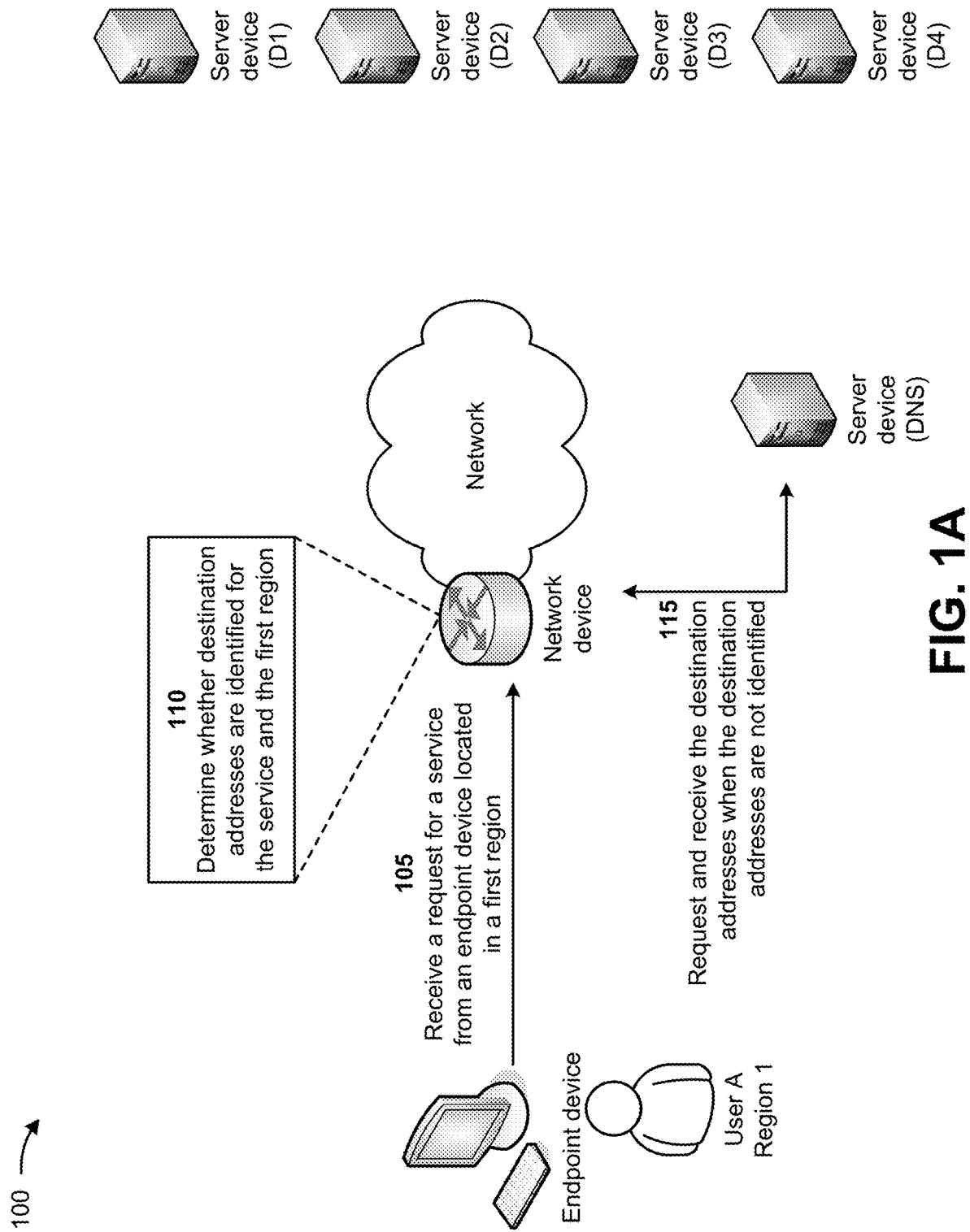
FIGS. 1A-1K are diagrams of an example associated with determining a best destination over a best path using multifactor path selection.

The following detailed description of example implementations refers to the accompanying drawings. The same reference numbers in different drawings may identify the same or similar elements.

Currently, when an endpoint device requests a service, a network device of network determines a best path based on several parameters including application service level agreement (SLA) metrics (e.g., quality of experience, latency, jitter, and/or the like requirements). However, while choosing the best path, the network device fails to consider where multiple destination server devices (e.g., hosting the service) are located. The service could be hosted on multiple server devices located at different geographical regions. The network device may choose the best possible path based on the application SLA metrics and/or based on a geographical location of a destination server device (e.g., a server device that is physically closest to the endpoint device). However, the approach based on the application SLA metrics fails to consider that the service is available at multiple destination server devices and via multiple paths. The approach based on the geographical location of the destination server device always selects the nearest possible server device based on the policy.

Thus, current techniques for selecting a destination server device for a service consume computing resources (e.g., processing resources, memory resources, communication resources, and/or the like), networking resources, and/or the like, associated with causing a degraded service to be provided by a nonoptimal server device over a nonoptimal path, handling complaints associated with a user experience due to the degraded service, generating unnecessary congestion in a network, losing traffic associated with the service due to the nonoptimal path, and/or the like.

Some implementations described herein relate to a network device that determines a best destination over a best path using multifactor path selection. For example, a network device may receive a request for a service from an endpoint device located in a first region, and may determine whether destination addresses are identified for the service and the first region. The network device may determine whether the service and the first region are identified in a multifactor path selection (MFPS) lookup table, based on the destination addresses being identified for the service and the first region, and may receive performance metrics associated with multiple paths in the first region to the destination addresses, based on the service and the first region not being identified in the MFPS lookup table. The network device may generate a performance metrics matrix based on the performance metrics, and may identify a best destination and a best path, and a next best destination and a next best path, for the service in the first region based on the performance metrics matrix. The network device may provide data identifying the best destination, the best path, the next best destination, and the next best path, for the first region, in the MFPS lookup table, and may cause, for the endpoint device, a connection to the service to be established via the best destination and the best path for the first region.

In this way, the network device determines a best destination over a best path using multifactor path selection. For example, the network device may determine the best destination over the best path based on SLA metrics associated with multiple destination server devices, multiple paths, and a service being provided. This may ensure that an endpoint device receives the service (e.g., an application) from the best destination server device of a plurality of server devices (e.g., hosting the application) associated with cloud service providers. Thus, the network device conserves computing resources, networking resources, and/or the like that would otherwise have been consumed by causing a degraded service to be provided by a nonoptimal server device over a nonoptimal path, handling complaints associated with a user experience due to the degraded service, generating unnecessary congestion in a network, losing traffic associated with the service due to the nonoptimal path, and/or the like.

FIGS. 1A-1K are diagrams of an example 100 associated with determining a best destination over a best path using multifactor path selection. As shown in FIGS. 1A-1K, example 100 includes an endpoint device, a network with a plurality of network devices, and a plurality of server devices. The server devices may include a domain name system (DNS) server device, a first server device with a first destination address (e.g., D1), a second server device with a second destination address (e.g., D2), a third server device with a third destination address (e.g., D3), and a fourth server device with a fourth destination address (e.g., D4). Further details of the endpoint device, the network, the network devices, and the server devices are provided elsewhere herein.

As shown in FIG. 1A, and by reference number 105, the network device may receive a request for a service from an endpoint device located in a first region (e.g., a geographical region). For example, a first user (e.g., User A) in the first region (e.g., Region 1) may wish to access a service that may be provided by the first through fourth server devices. The first user may utilize the endpoint device to generate the request for the service and may cause the endpoint device to provide the request for the service to the network. The network device (e.g., a web gateway) may receive the request for the service from the endpoint device.

As further shown in FIG. 1A, and by reference number 110, the network device may determine whether destination addresses are identified for the service and the first region. For example, the network device may determine whether destination addresses (e.g., of one or more of the first through fourth server devices) are identified for the service and the first region. The destination addresses for the service and the first region may be identified if the network device previously enabled access to the service for an endpoint device associated with the first region. In such situations, the network device may have previously received the destination addresses for the service and the first region from the DNS server device. The destination addresses for the service and the first region may not be identified if the network device has not enabled access to the service for an endpoint device associated with the first region.

As further shown in FIG. 1A, and by reference number 115, the network device may request and receive the destination addresses when the destination addresses are not identified for the service and/or the first region. For example, when the network device determines that the destination addresses are not identified for the service and/or the first region, the network device may perform a DNS resolution to obtain the destination addresses. The DNS resolution may include the network device generating a request for the destination addresses (e.g., of one or more of the first through fourth server devices) associated with the service and the first region. The network device may provide the request for the destination addresses to the DNS server device, and the DNS server device may identify the destination addresses of the first through fourth server devices (e.g., D1, D2, D3, and D4) based on the request. The DNS server device may provide the destination addresses to the network device, and the network device may receive the destination addresses.

Figure 1B:
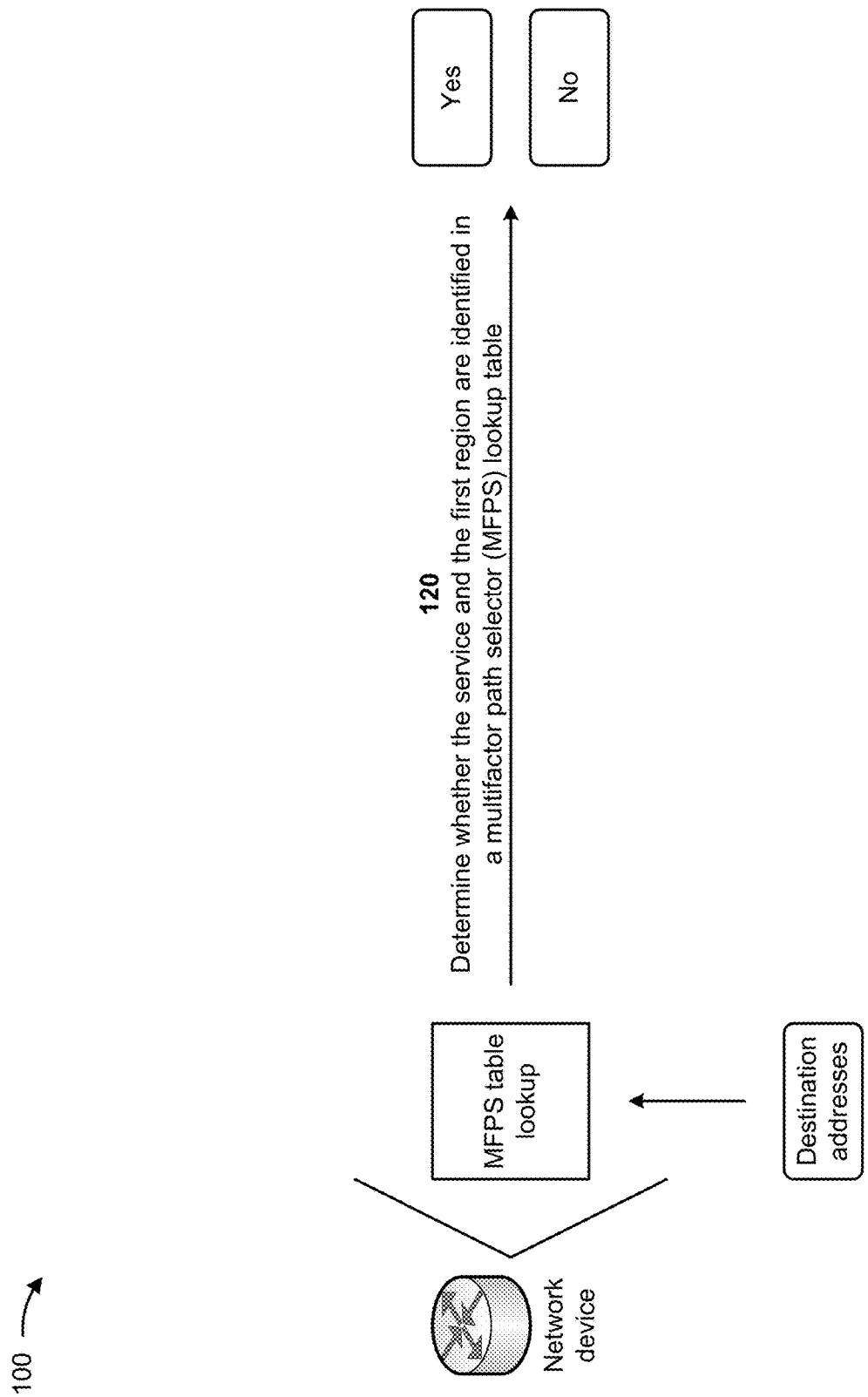

As shown in FIG. 1B, and by reference number 120, the network device may determine whether the service and the first region are identified in an MFPS lookup table. For example, the network device may maintain and store an MFPS lookup table that identifies paths (e.g., through the network) for the destination addresses associated with the service and the first region, and availabilities associated with the paths. If the network device previously enabled the service to be provided to an endpoint device in the first region, from the first through fourth service devices, the network device may have previously included the service and the first region in the MFPS lookup table. Thus, the network device may determine that the service and the first region are identified in the MFPS lookup table. If the network device has not enabled the service to be provided to an endpoint device in the first region, from the first through fourth service devices, the network device may not have included the service and the first region in the MFPS lookup table. Thus, the network device may determine that the service and the first region are not identified in the MFPS lookup table.

Figure 1C:
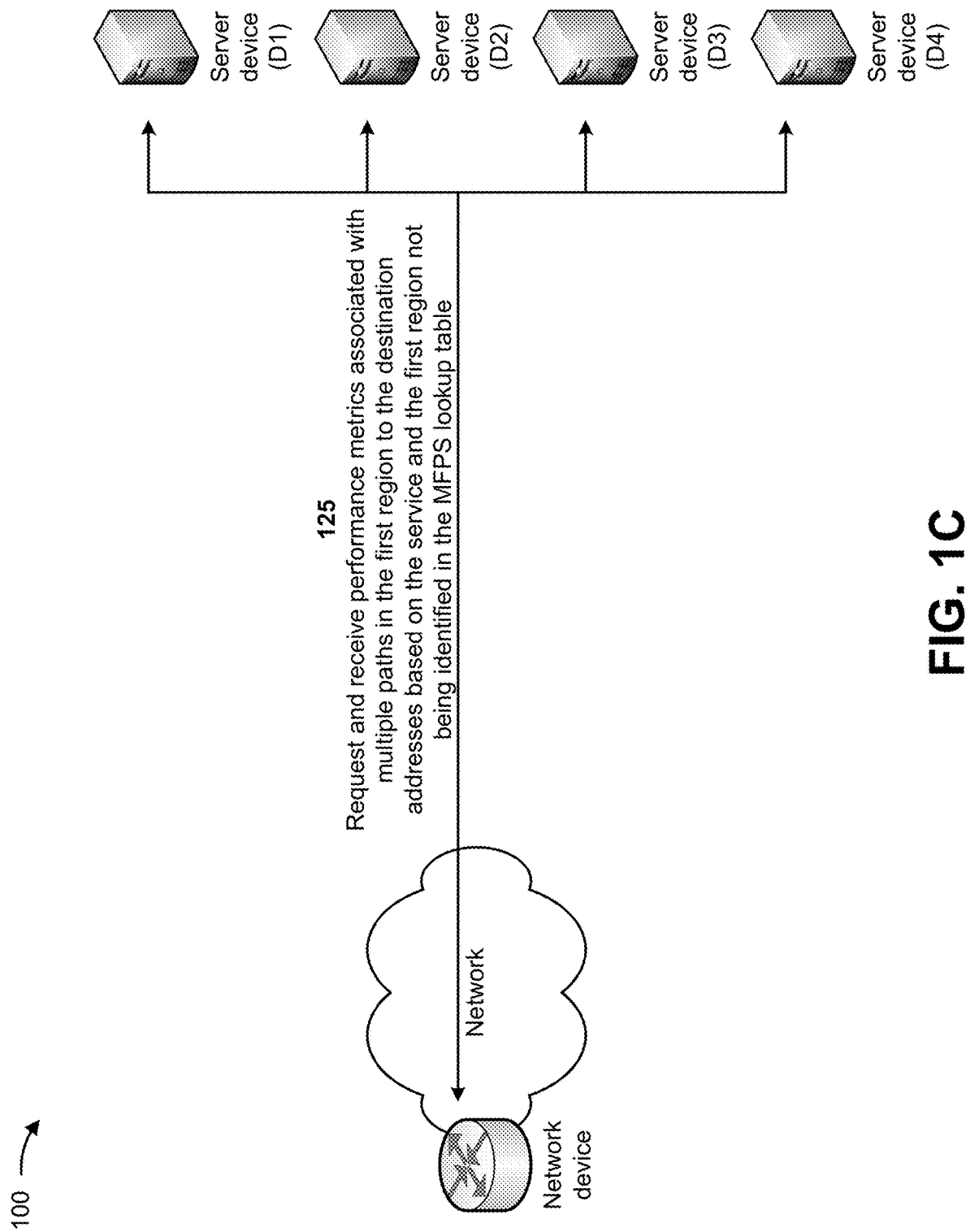

As shown in FIG. 1C, and by reference number 125, the network device may request and receive performance metrics associated with multiple paths in the first region to the destination addresses based on the service and the first region not being identified in the MFPS lookup table. For example, the network device may determine that the service and the first region are not identified in the MFPS lookup table when the network device has not enabled the service to be provided to an endpoint device in the first region from the first through fourth service devices. When the network device determines that the service and the first region are not identified in the MFPS lookup table, the network device may initiate SLA probes for the destination addresses over all available paths (e.g., through the network) associated with the destination addresses. An SLA probe is a network performance measurement and diagnostic tool that uses active monitoring via generation of traffic in a continuous, reliable, and predictable manner. An SLA probe may transmit traffic across the network to measure performance metrics associated with multiple destination addresses and multiple paths. The performance metrics may include availability metrics (e.g., percent availability of a path), jitter metrics, latency metrics, response times, packet loss metrics, and/or the like. The network device may utilize the SLA probes to request and receive, from the network, the performance metrics associated with the multiple paths in the first region to the destination addresses. In some implementations, the network device may initiate the SLA probes after a predetermined time period, when a request for a service is not received, every time a request for a service is received, and/or the like.

Figure 1D:
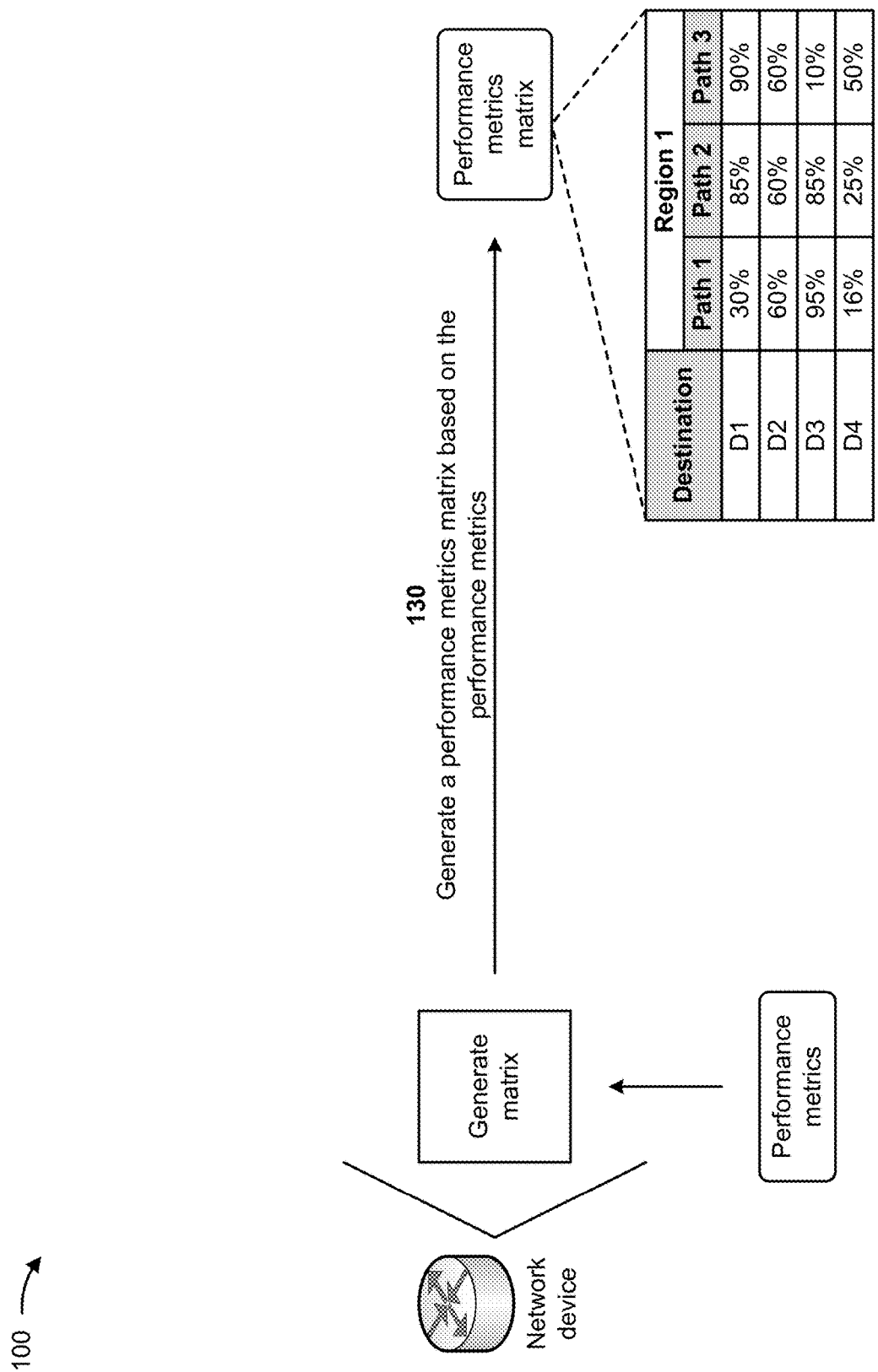

As shown in FIG. 1D, and by reference number 130, the network device may generate a performance metrics matrix based on the performance metrics. For example, the network device may create the performance metrics matrix and may populate the performance metrics matrix with the performance metrics associated with the multiple paths in the first region to the destination addresses. In some implementations, the network device may utilize one or more of the performance metrics, associated with the multiple paths in the first region to the destination addresses, to populate the performance metrics matrix. For example, the network device may utilize availability metrics associated with the multiple paths in the first region to the destination addresses.

As further shown in FIG. 1D, the performance metrics matrix may include information indicating that a first path in the first region to the first destination address (e.g., D1) has a 30% availability, the first path in the first region to the second destination address (e.g., D2) has a 60% availability, the first path in the first region to the third destination address (e.g., D3) has a 95% availability, and the first path in the first region to the fourth destination address (e.g., D4) has a 16% availability. The performance metrics matrix may include information indicating that a second path in the first region to the first destination address (e.g., D1) has an 85% availability, the second path in the first region to the second destination address (e.g., D2) has a 60% availability, the second path in the first region to the third destination address (e.g., D3) has an 85% availability, and the second path in the first region to the fourth destination address (e.g., D4) has a 25% availability. The performance metrics matrix may include information indicating that a third path in the first region to the first destination address (e.g., D1) has a 90% availability, the third path in the first region to the second destination address (e.g., D2) has a 60% availability, the third path in the first region to the third destination address (e.g., D3) has a 10% availability, and the third path in the first region to the fourth destination address (e.g., D4) has a 50% availability.

Figure 1E:
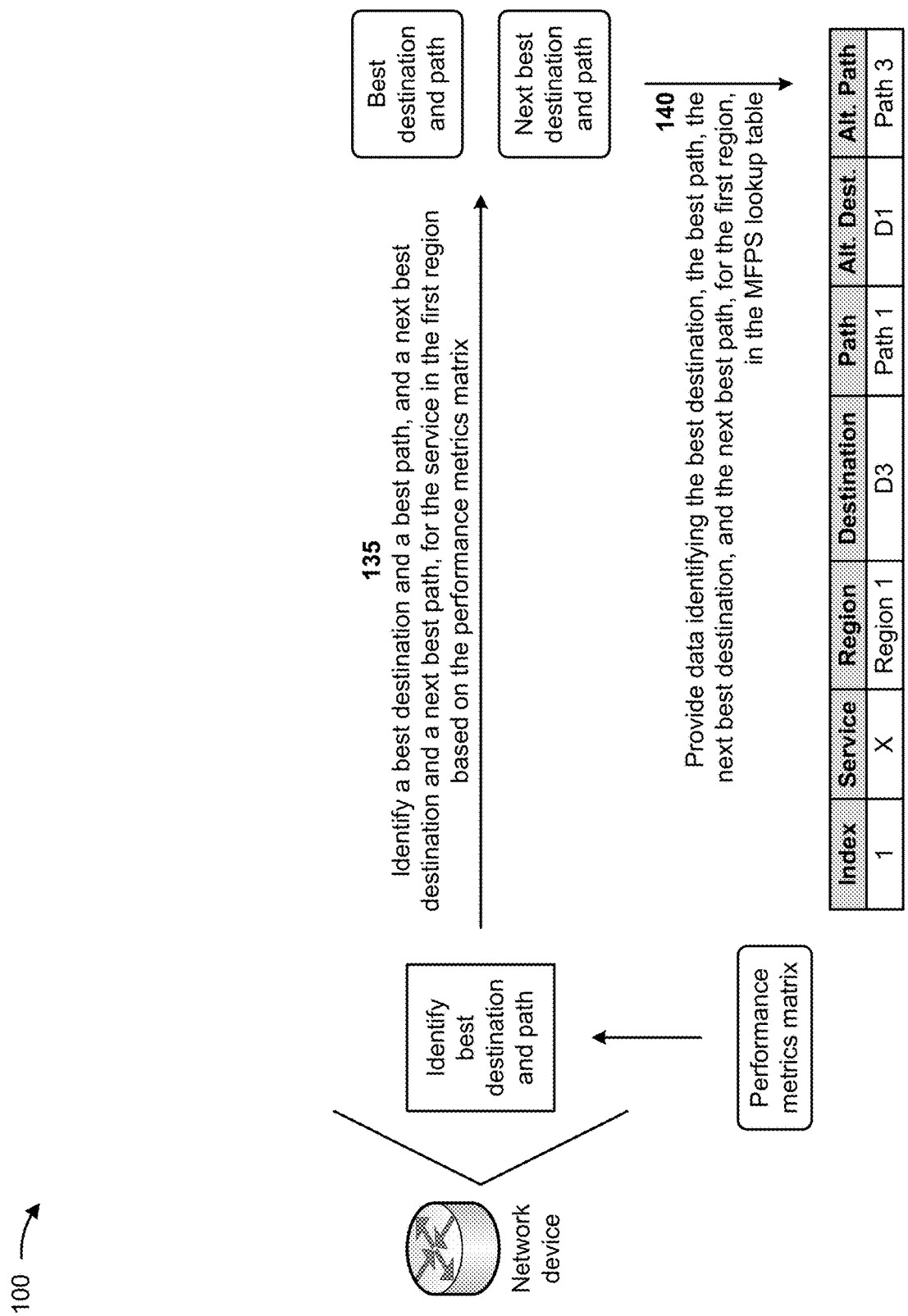

As shown in FIG. 1E, and by reference number 135, the network device may identify a best destination and a best path, and a next best destination and a next best path, for the service in the first region based on the performance metrics matrix. For example, the network device may rank the availabilities in the performance metrics matrix, and may determine that the first path in the first region to the third destination address (e.g., D3) (e.g., a 95% availability, which is the greatest availability) is the best path and the best destination, respectively, based on ranking the availabilities. The network device may determine that the third path in the first region to the first destination address (e.g., D1) (e.g., a 90% availability, which is the next greatest availability) are the next best path and the next best destination, respectively, based on ranking the availabilities.

As further shown in FIG. 1E, and by reference number 140, the network device may provide data identifying the best destination, the best path, the next best destination, and the next best path, for the first region, in the MFPS lookup table. For example, the network device may populate the MFPS lookup table with the data identifying the best destination, the best path, the next best destination, and the next best path for the first region. As shown in FIG. 1E, the network device may populate the MFPS lookup table with data identifying an index (e.g., 1) for the service, the service (e.g., X) requested by the endpoint device, the region (e.g., Region 1), the best destination (e.g., the third destination address, D3, of the third server device), the best path (e.g., the first path, Path 1), the next best destination (e.g., the first destination address, D1, of the first service device), and the next best path (e.g., the third path, Path 3).

Figure 1F:
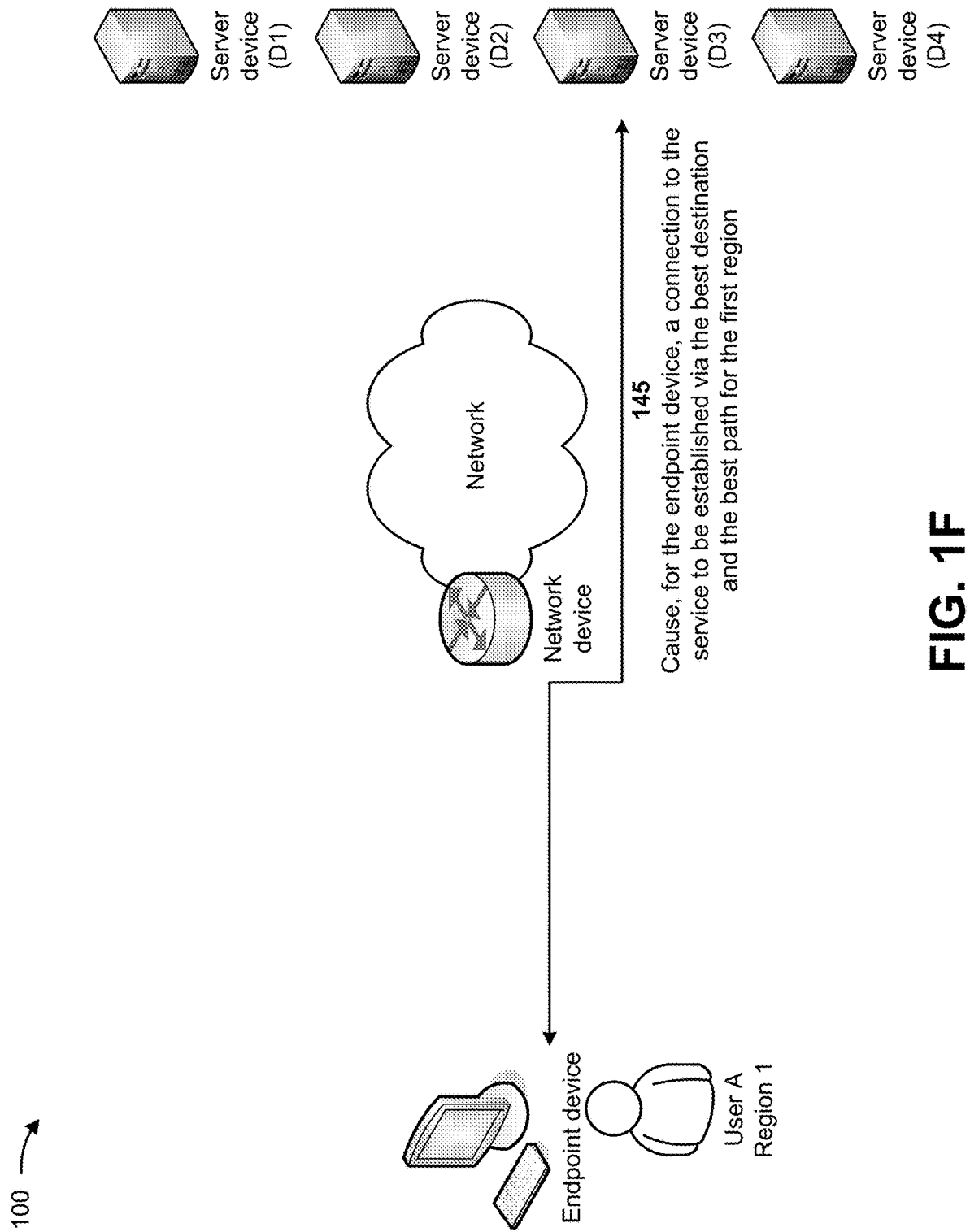

As shown in FIG. 1F, and by reference number 145, the network device may cause, for the endpoint device, a connection to the service to be established via the best destination and the best path for the first region. For example, the network device may cause the connection to the service to be established for the endpoint device. The connection may be established via the best destination (e.g., the third destination address, D3, of the third server device) and the best path (e.g., the first path, Path 1) for the first region. The third server device may utilize the connection to provide the service to the endpoint device.

Figure 1G:
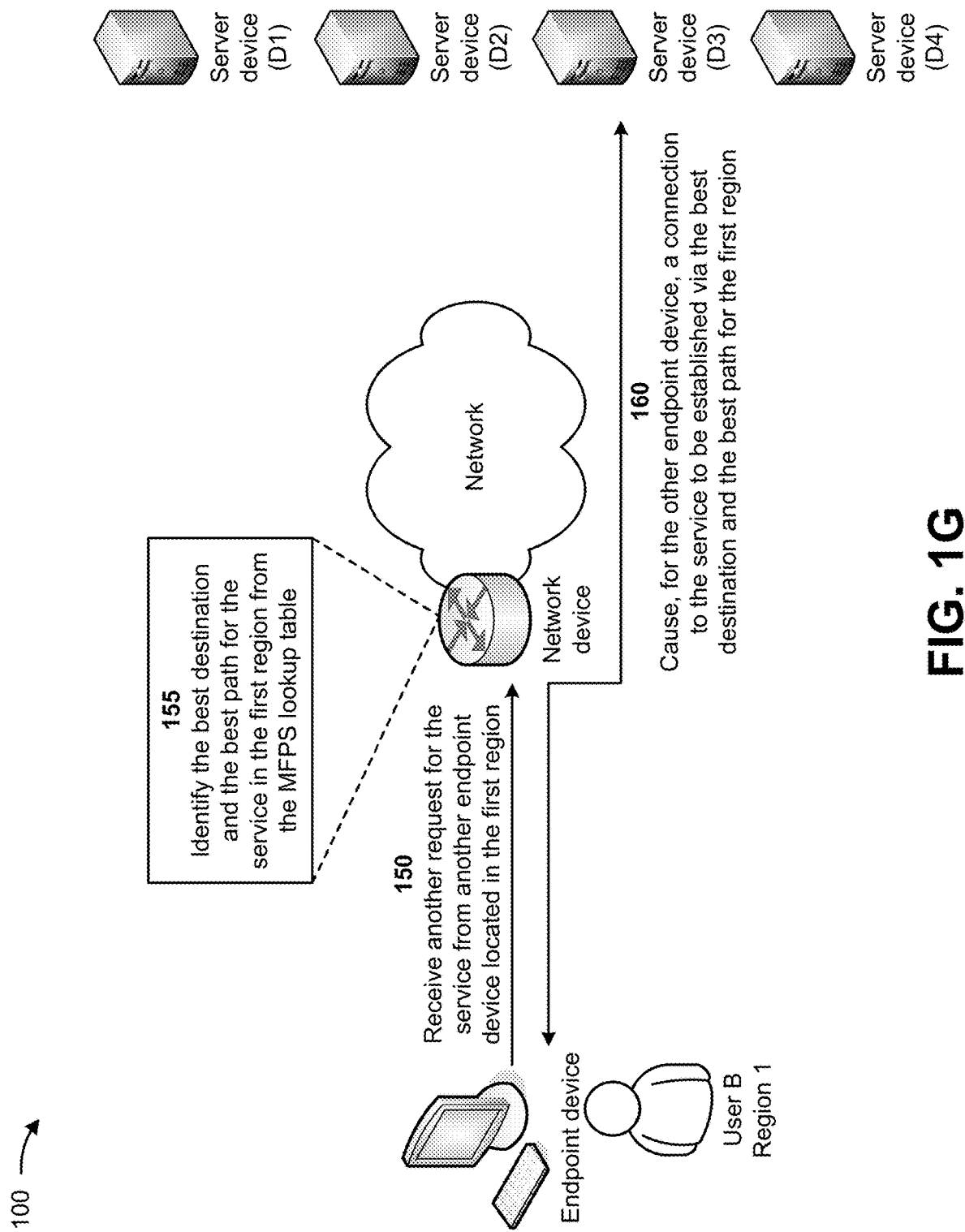

As shown in FIG. 1G, and by reference number 150, the network device may receive another request for the service from another endpoint device located in the first region. For example, a second user (e.g., User B) in the first region (e.g., Region 1) may wish to access the service that may be provided by the first through fourth server devices. The second user may utilize the other endpoint device to generate the other request for the service and may cause the other endpoint device to provide the other request for the service to the network. The network device may receive the other request for the service from the other endpoint device.

As further shown in FIG. 1G, and by reference number 155, the network device may identify the best destination and the best path for the service in the first region from the MFPS lookup table. For example, the network device may determine that the destination addresses (e.g., of one or more of the first through fourth server devices) are identified for the service and the first region. Thus, the network device need not request and receive the destination addresses for the service and the first region from the DNS server device. The network device may also determine that the service and the first region are identified in the MFPS lookup table. Thus, the network device need not request and receive the performance metrics associated with the multiple paths in the first region to the destination addresses, and need not generate the performance metrics matrix based on the performance metrics. Rather, the network device may analyze the MFPS lookup table to identify the best destination and the best path for the service in the first region from the MFPS lookup table. For example, the network device may identify the first path in the first region to the third destination address (e.g., D3) (e.g., a 95% availability, which is the greatest availability) as the best path and the best destination for the service in the first region.

As further shown in FIG. 1G, and by reference number 160, the network device may cause, for the other endpoint device, a connection to the service to be established via the best destination and the best path for the first region. For example, the network device may cause the connection to the service to be established for the other endpoint device. The connection may be established via the best destination (e.g., the third destination address, D3, of the third server device) and the best path (e.g., the first path, Path 1) for the first region. The third server device may utilize the connection to provide the service to the other endpoint device.

Figure 1H:
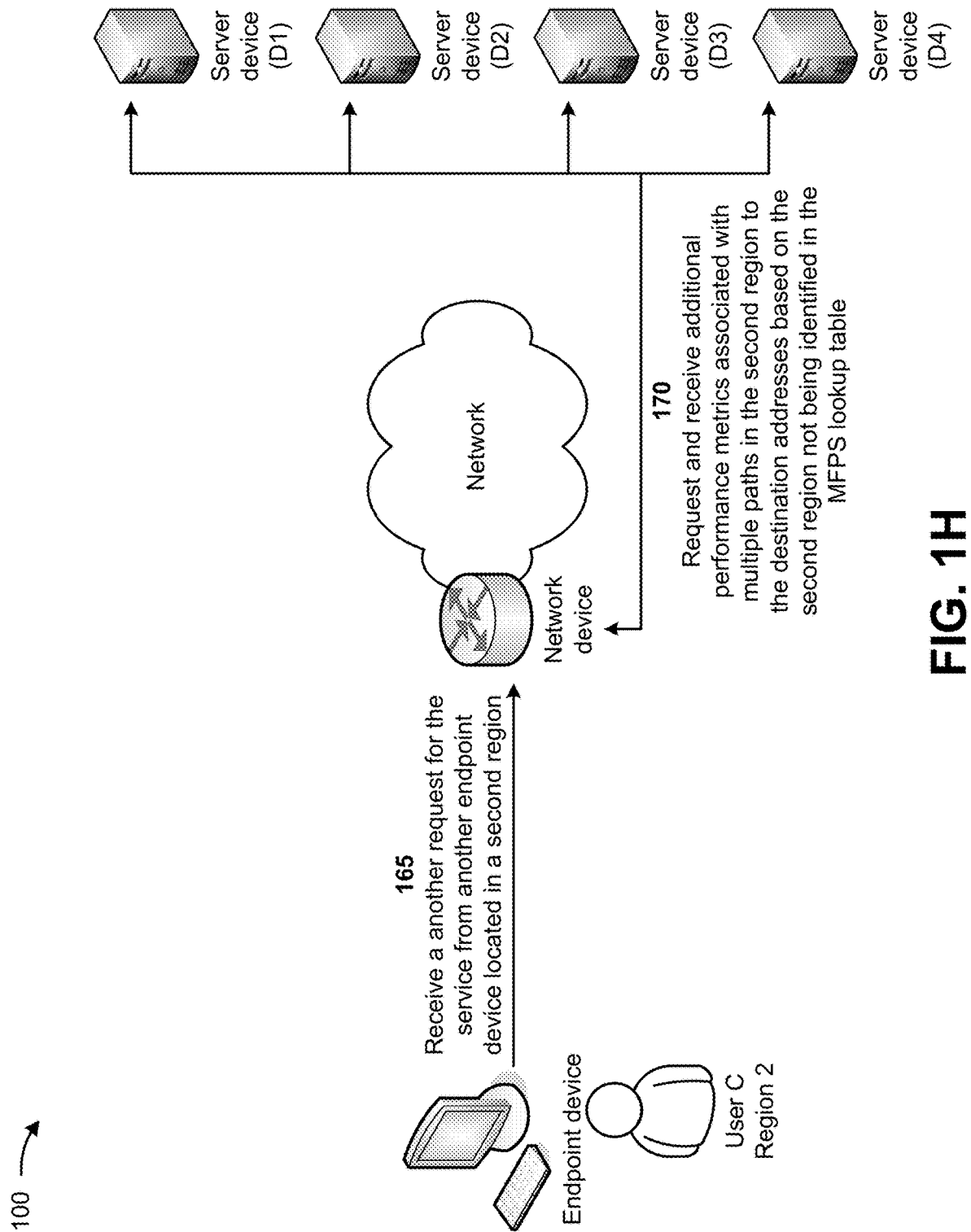

As shown in FIG. 1H, and by reference number 165, the network device may receive another request for the service from another endpoint device located in a second region (e.g., another geographical region separate from the first region). For example, a third user (e.g., User C) in the second region (e.g., Region 2) may wish to access the service that may be provided by the first through fourth server devices. The third user may utilize the other endpoint device to generate the other request for the service and may cause the other endpoint device to provide the other request for the service to the network. The network device may receive the other request for the service from the other endpoint device.

As further shown in FIG. 1H, and by reference number 170, the network device may request and receive additional performance metrics associated with multiple paths in the second region to the destination addresses based on the second region not being identified in the MFPS lookup table. For example, the network device may determine that the destination addresses (e.g., of one or more of the first through fourth server devices) are identified for the service and the second region. Thus, the network device need not request and receive the destination addresses for the service and the second region from the DNS server device. However, the network device may determine that the second region is not identified in the MFPS lookup table. Thus, the network device may request and receive, from the network, the additional performance metrics associated with the multiple paths in the second region to the destination addresses.

The network device may determine that the second region is not identified in the MFPS lookup table when the network device has not enabled the service to be provided to an endpoint device in the second region from the first through fourth service devices. When the network device determines that the second region is not identified in the MFPS lookup table, the network device may initiate the SLA probes for the destination addresses over all available paths (e.g., through the network) associated with the destination addresses. The additional performance metrics may include availability metrics (e.g., percent availability of a path), jitter metrics, latency metrics, response times, packet loss metrics, and/or the like. The network device may utilize the SLA probes to request and receive, from the network, the performance metrics associated with the multiple paths in the second region to the destination addresses.

Figure 1I:
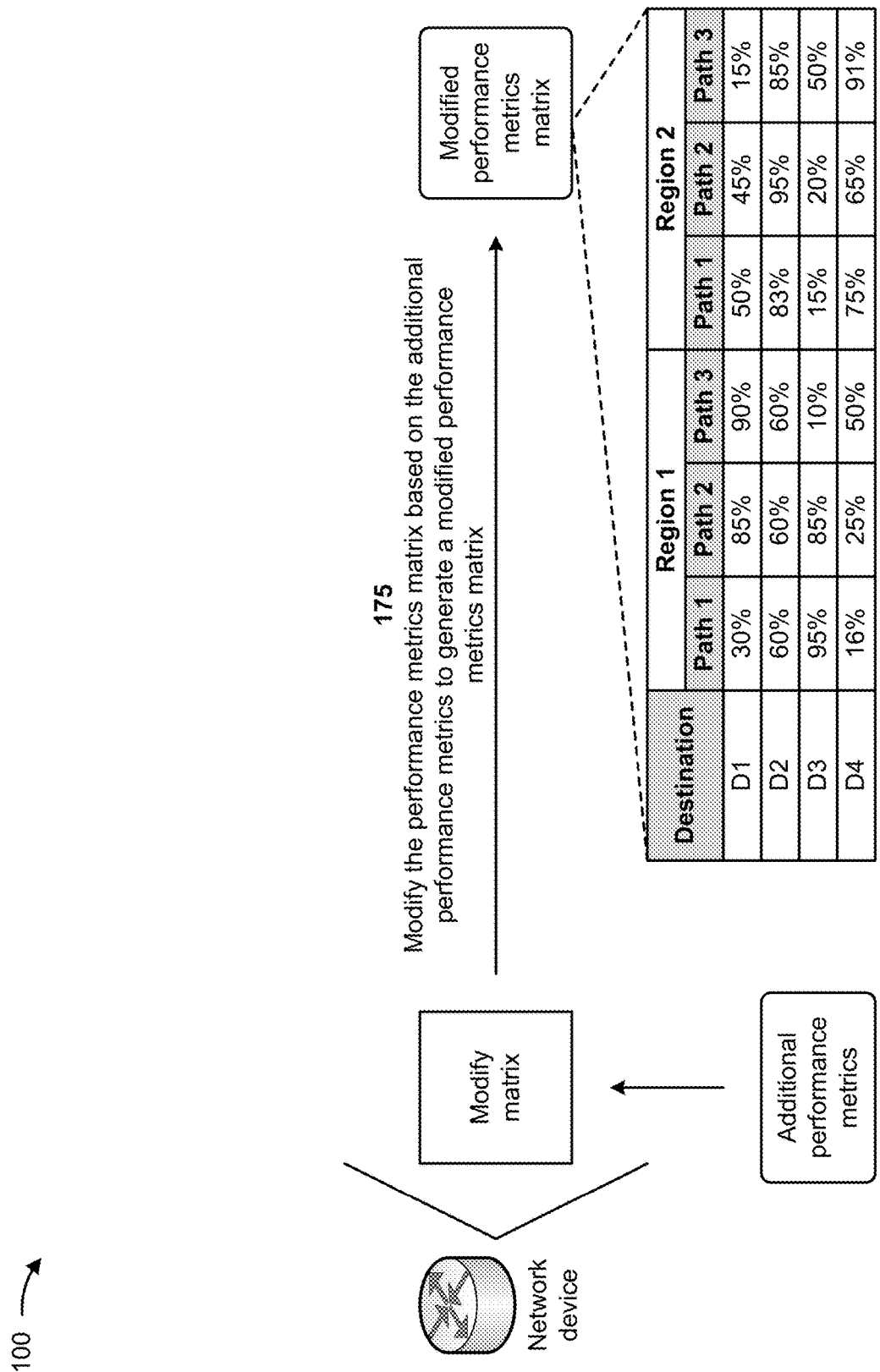

As shown in FIG. 1I, and by reference number 175, the network device may modify the performance metrics matrix based on the additional performance metrics to generate a modified performance metrics matrix. For example, the network device may populate the performance metrics matrix with the additional performance metrics associated with the multiple paths in the second region to the destination addresses. In some implementations, the network device may utilize one or more of the additional performance metrics, associated with the multiple paths in the second region to the destination addresses, to modify the performance metrics matrix. For example, the network device may utilize availability metrics associated with the multiple paths in the second region to the destination addresses.

As further shown in FIG. 1I, the modified performance metrics matrix may include information indicating that the first path in the second region to the first destination address (e.g., D1) has a 50% availability, the first path in the second region to the second destination address (e.g., D2) has an 83% availability, the first path in the second region to the third destination address (e.g., D3) has a 15% availability, and the first path in the second region to the fourth destination address (e.g., D4) has a 75% availability. The performance metrics matrix may include information indicating that the second path in the second region to the first destination address (e.g., D1) has a 45% availability, the second path in the second region to the second destination address (e.g., D2) has a 95% availability, the second path in the second region to the third destination address (e.g., D3) has a 20% availability, and the second path in the second region to the fourth destination address (e.g., D4) has a 65% availability. The performance metrics matrix may include information indicating that the third path in the second region to the first destination address (e.g., D1) has a 15% availability, the third path in the second region to the second destination address (e.g., D2) has an 85% availability, the third path in the second region to the third destination address (e.g., D3) has a 50% availability, and the third path in the second region to the fourth destination address (e.g., D4) has a 91% availability.

Figure 1J:
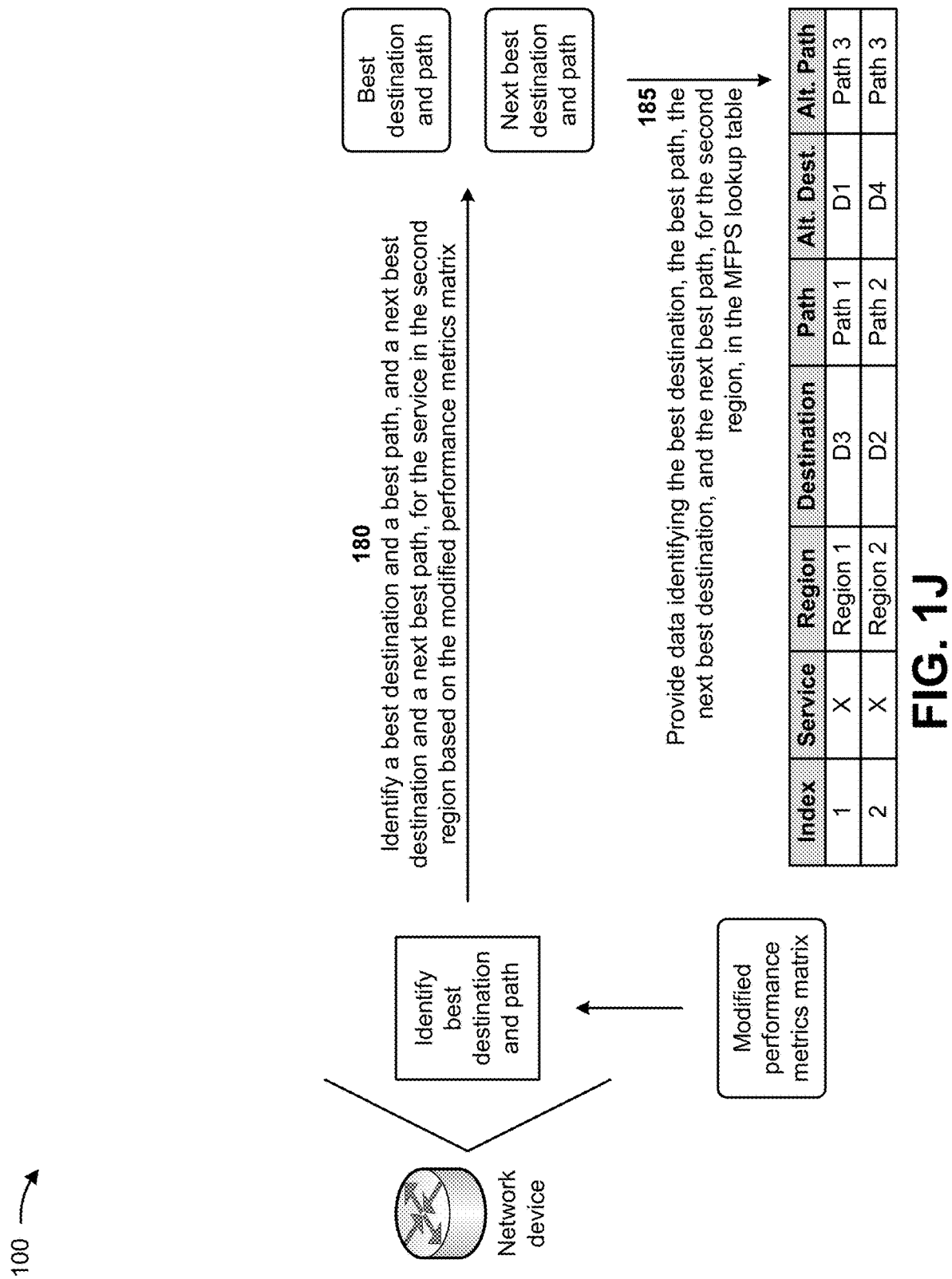

As shown in FIG. 1J, and by reference number 180, the network device may identify a best destination and a best path, and a next best destination and a next best path, for the service in the second region based on the modified performance metrics matrix. For example, the network device may rank the availabilities in the modified performance metrics matrix for the second region, and may determine that the second path in the second region to the second destination address (e.g., D2) (e.g., a 95% availability, which is the greatest availability) are the best path and the best destination, respectively, based on ranking the availabilities. The network device may determine that the third path in the second region to the fourth destination address (e.g., D4) (e.g., a 91% availability, which is the next greatest availability) are the next best path and the next best destination, respectively, based on ranking the availabilities.

As further shown in FIG. 1J, and by reference number 185, the network device may provide data identifying the best destination, the best path, the next best destination, and the next best path, for the second region, in the MFPS lookup table. For example, the network device may populate the MFPS lookup table with the data identifying the best destination, the best path, the next best destination, and the next best path for the second region. As shown in FIG. 1J, the network device may populate the MFPS lookup table with data identifying an index (e.g., 2) for the service, the service (e.g., X) requested by the other endpoint device, the region (e.g., Region 2), the best destination (e.g., the second destination address, D2, of the second server device), the best path (e.g., the second path, Path 2), the next best destination (e.g., the fourth destination address, D4, of the fourth service device), and the next best path (e.g., the third path, Path 3).

Figure 1K:
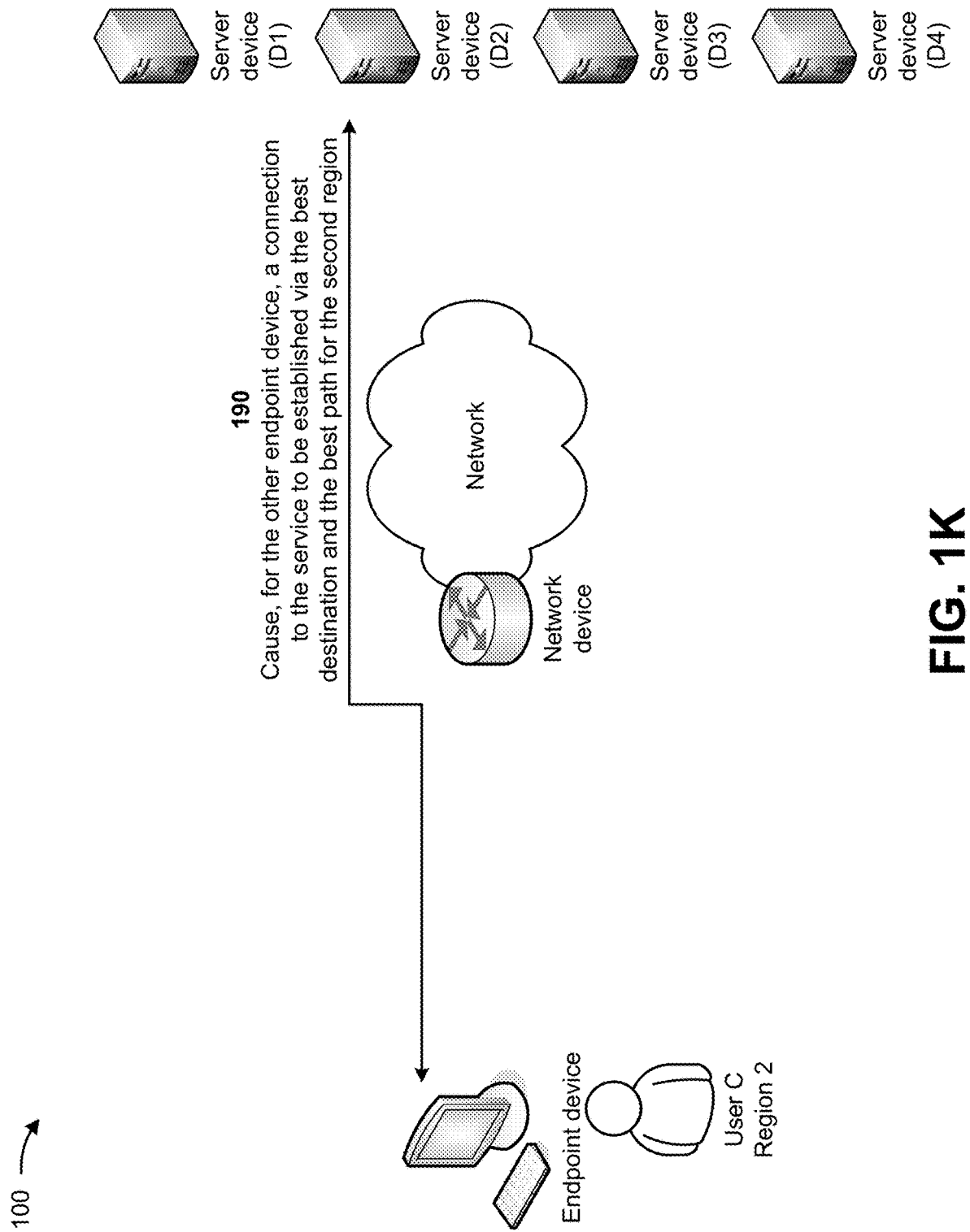

As shown in FIG. 1K, and by reference number 190, the network device may cause, for the other endpoint device, a connection to the service to be established via the best destination and the best path for the second region. For example, the network device may cause the connection to the service to be established for the other endpoint device. The connection may be established via the best destination (e.g., the second destination address, D2, of the second server device) and the best path (e.g., the second path, Path 2) for the second region. The second server device may utilize the connection to provide the service to the other endpoint device.

In this way, the network device determines a best destination over a best path using multifactor path selection. For example, the network device may determine the best destination over the best path based on SLA metrics associated with multiple destination server devices, multiple paths, and a service being provided. This may ensure that an endpoint device receives the service (e.g., an application) from the best destination server device of a plurality of server devices (e.g., hosting the application) associated with cloud service providers. Thus, the network device conserves computing resources, networking resources, and/or the like that would otherwise have been consumed by causing a degraded service to be provided by a nonoptimal server device over a nonoptimal path, handling complaints associated with a user experience due to the degraded service, generating unnecessary congestion in a network, losing traffic associated with the service due to the nonoptimal path, and/or the like.

As indicated above, FIGS. 1A-1K are provided as an example. Other examples may differ from what is described with regard to FIGS. 1A-1K. The number and arrangement of devices shown in FIGS. 1A-1K are provided as an example. In practice, there may be additional devices, fewer devices, different devices, or differently arranged devices than those shown in FIGS. 1A-1K. Furthermore, two or more devices shown in FIGS. 1A-1K may be implemented within a single device, or a single device shown in FIGS. 1A-1K may be implemented as multiple, distributed devices. Additionally, or alternatively, a set of devices (e.g., one or more devices) shown in FIGS. 1A-1K may perform one or more functions described as being performed by another set of devices shown in FIGS. 1A-1K.

Figure 2:
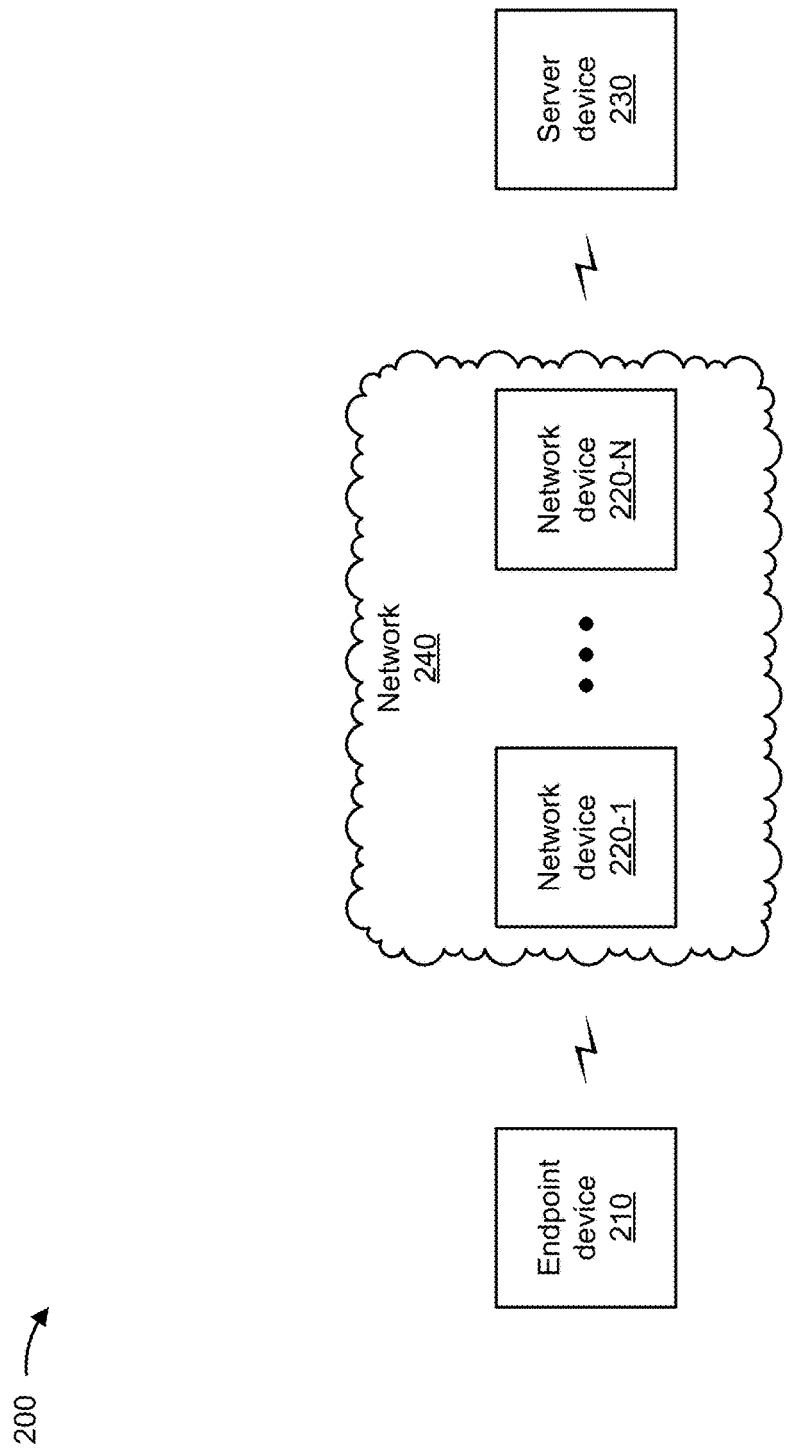
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (shown as network device 220-1 through network device 220-N), a server device 230, and a network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a set-top box, a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device (e.g., a router, a residential gateway, and/or the like), or a similar type of device. In some implementations, the endpoint device 210 may receive network traffic from and/or may provide network traffic to other endpoint devices 210 and/or the server device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 includes one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 includes computing hardware used in a cloud computing environment.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (NAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
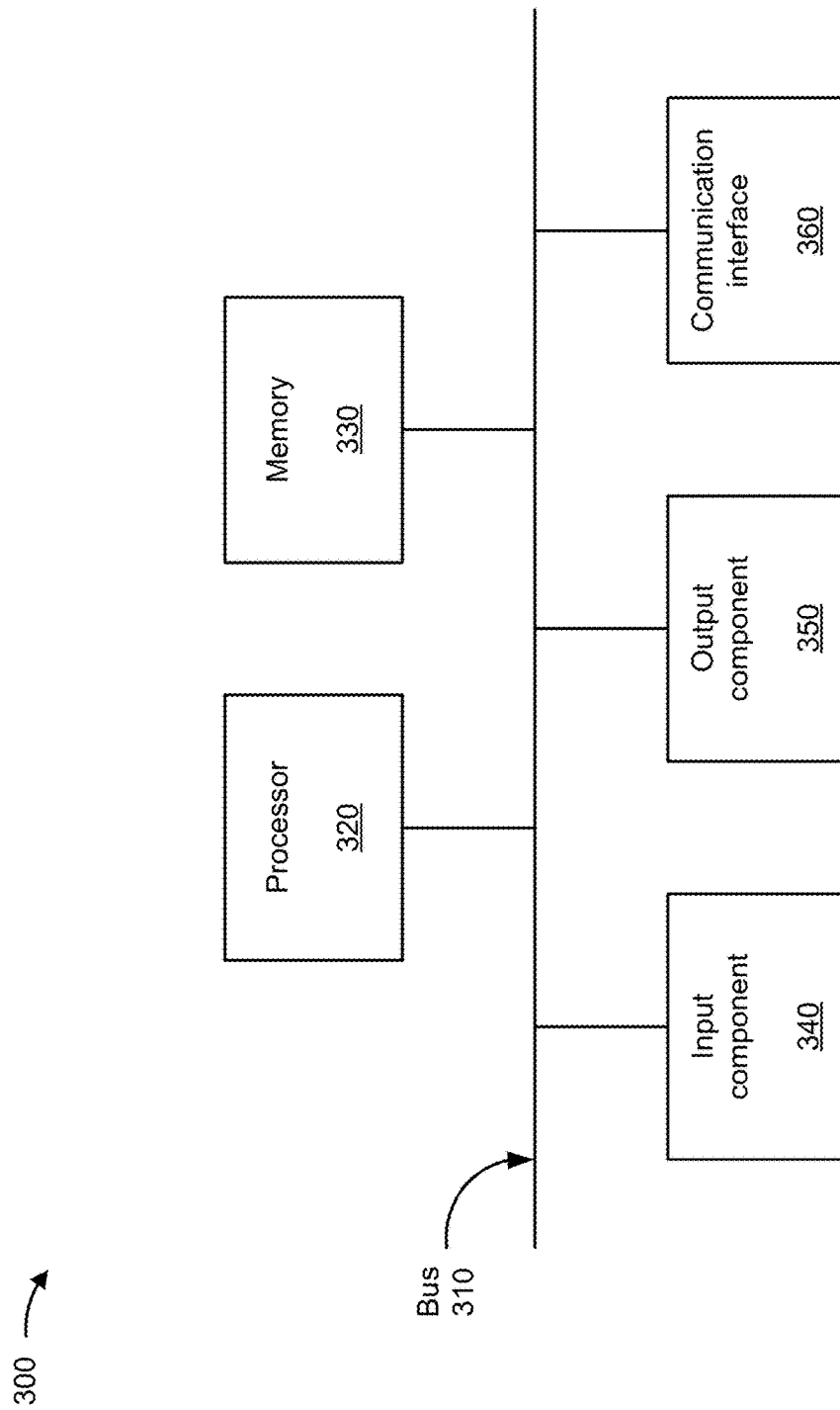
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, and/or the server device 230. In some implementations, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
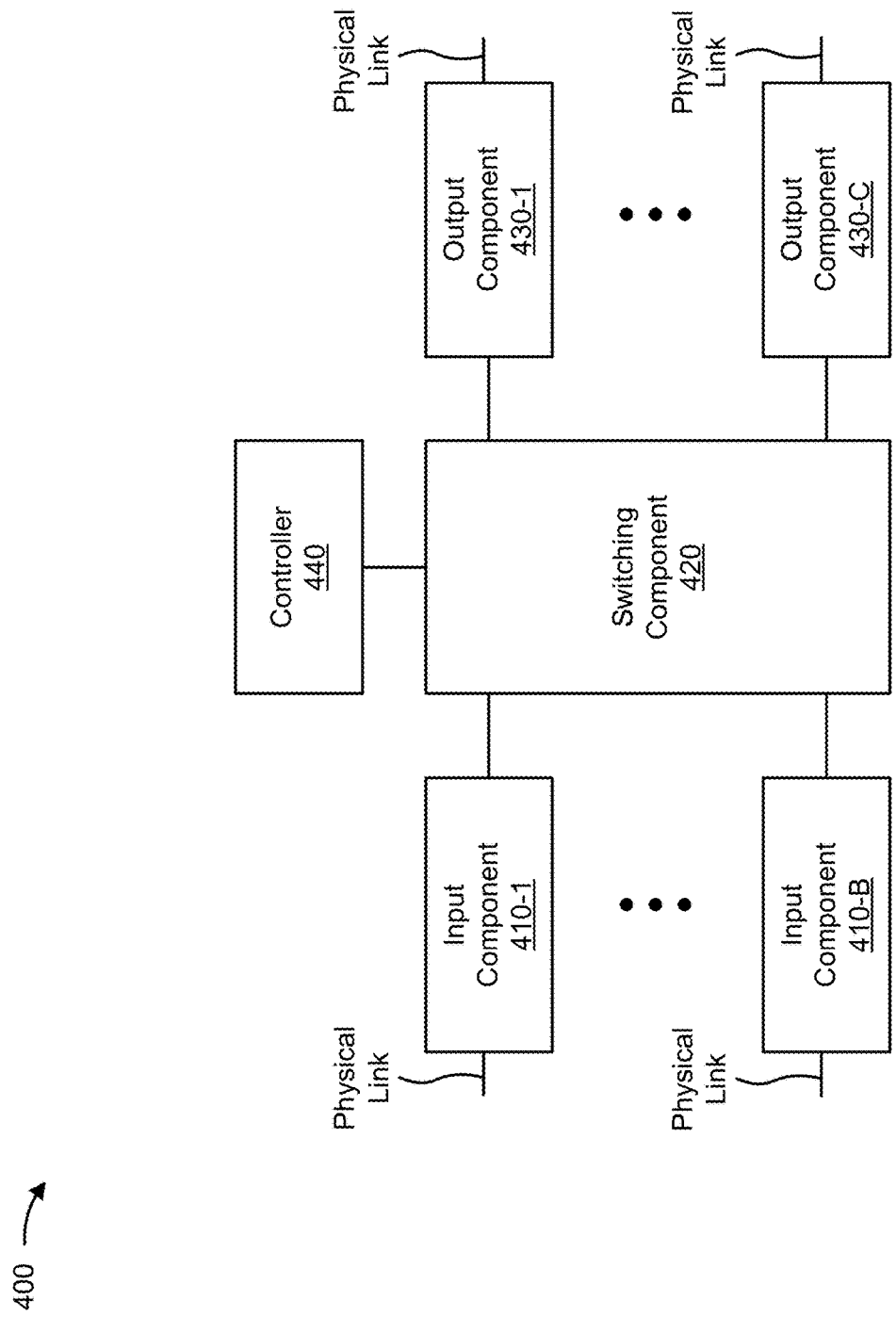

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
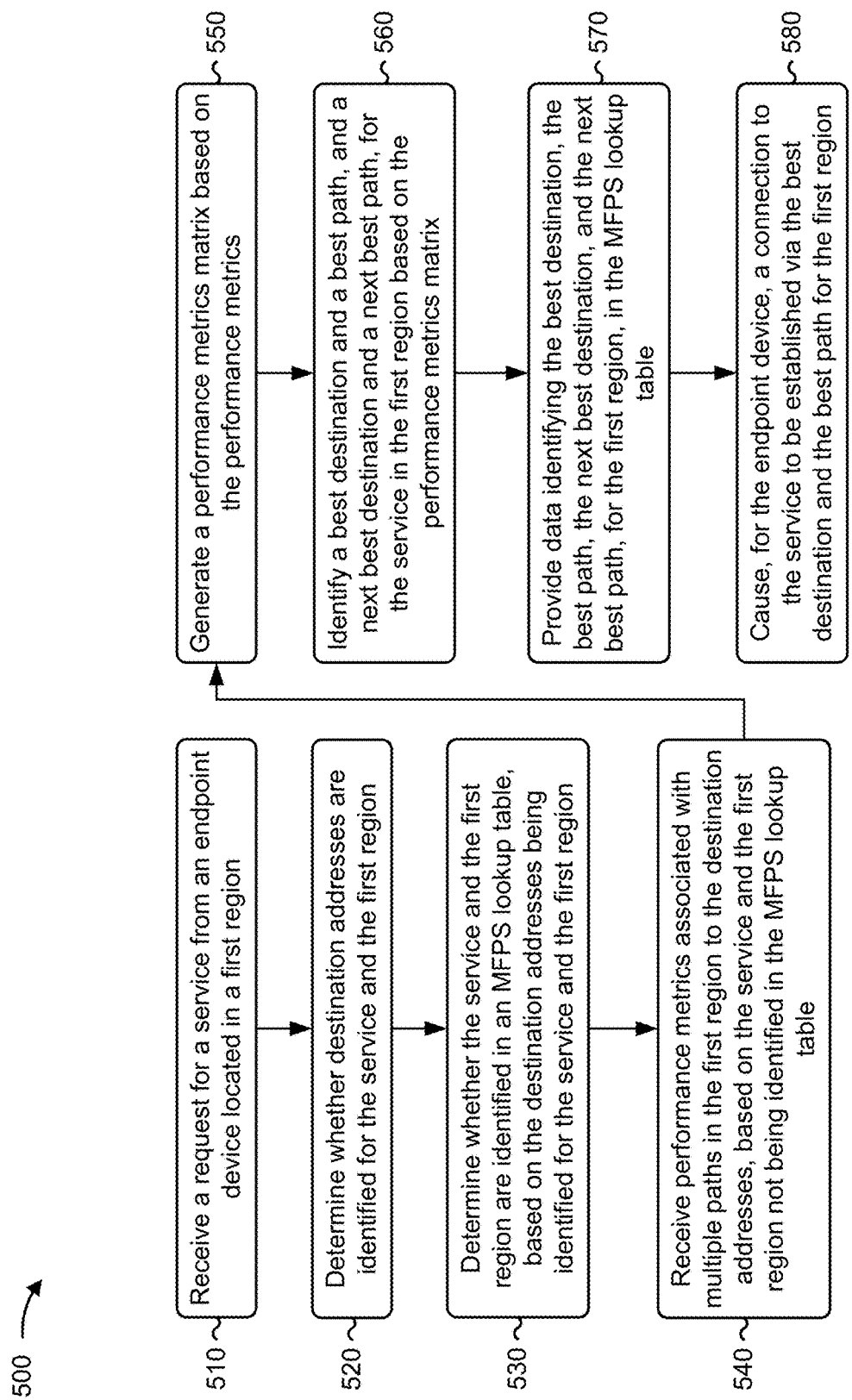
FIG. 5 is a flowchart of an example process for determining a best destination over a best path using multifactor path selection.

FIG. 5 is a flowchart of an example process 500 for determining a best destination over a best path using multifactor path selection. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210) and/or a server device (e.g., the server device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving a request for a service from an endpoint device located in a first region (block 510). For example, the network device may receive a request for a service from an endpoint device located in a first region, as described above. In some implementations, the network device is a web gateway.

As further shown in FIG. 5, process 500 may include determining whether destination addresses are identified for the service and the first region (block 520). For example, the network device may determine whether destination addresses are identified for the service and the first region, as described above.

As further shown in FIG. 5, process 500 may include determining whether the service and the first region are identified in an MFPS lookup table, based on the destination addresses being identified for the service and the first region (block 530). For example, the network device may determine whether the service and the first region are identified in an MFPS lookup table, based on the destination addresses being identified for the service and the first region, as described above.

As further shown in FIG. 5, process 500 may include receiving performance metrics associated with multiple paths in the first region to the destination addresses, based on the service and the first region not being identified in the MFPS lookup table (block 540). For example, the network device may receive performance metrics associated with multiple paths in the first region to the destination addresses, based on the service and the first region not being identified in the MFPS lookup table, as described above. In some implementations, receiving the performance metrics associated with the multiple paths in the first region to the destination addresses includes requesting the performance metrics from server devices associated with the destination addresses, and receiving the performance metrics from the server devices associated with the destination addresses based on requesting the performance metrics.

As further shown in FIG. 5, process 500 may include generating a performance metrics matrix based on the performance metrics (block 550). For example, the network device may generate a performance metrics matrix based on the performance metrics, as described above.

As further shown in FIG. 5, process 500 may include identifying a best destination and a best path, and a next best destination and a next best path, for the service in the first region based on the performance metrics matrix (block 560). For example, the network device may identify a best destination and a best path, and a next best destination and a next best path, for the service in the first region based on the performance metrics matrix, as described above. In some implementations, identifying the best destination and the best path for the service in the first region from the MFPS lookup table includes determining whether the service and the first region are identified in the MFPS lookup table, and identifying the best destination and the best path for the service in the first region from the MFPS lookup table, based on the service and the first region being identified in the MFPS lookup table.

As further shown in FIG. 5, process 500 may include providing data identifying the best destination, the best path, the next best destination, and the next best path, for the first region, in the MFPS lookup table (block 570). For example, the network device may provide data identifying the best destination, the best path, the next best destination, and the next best path, for the first region, in the MFPS lookup table, as described above.

As further shown in FIG. 5, process 500 may include causing, for the endpoint device, a connection to the service to be established via the best destination and the best path for the first region (block 580). For example, the network device may cause, for the endpoint device, a connection to the service to be established via the best destination and the best path for the first region, as described above.

In some implementations, process 500 includes requesting, from a DNS server device, the destination addresses based on the destination addresses not being identified for the service or the first region, and receiving, from the DNS server device, the destination addresses based on requesting the destination addresses.

In some implementations, process 500 includes receiving updated performance metrics associated with the multiple paths in the first region after a predetermined time period.

In some implementations, process 500 includes receiving another request for the service from another endpoint device located in the first region; identifying the best destination and the best path for the service in the first region from the MFPS lookup table; and causing, for the other endpoint device, another connection to the service to be established via the best destination and the best path for the first region.

In some implementations, process 500 includes receiving another request for the service from another endpoint device located in a second region that is separate from the first region; receiving additional performance metrics associated with multiple paths in the second region to the destination addresses based on the second region not being identified in the MFPS lookup table; modifying the performance metrics matrix based on the additional performance metrics to generate a modified performance metrics matrix; identifying a best destination and a best path, and a next best destination and a next best path, for the service in the second region, based on the modified performance metrics matrix; and providing data identifying the best destination, the best path, the next best destination, and the next best path, for the second region, in the MFPS lookup table.

In some implementations, process 500 includes causing, for the other endpoint device, another connection to the service to be established via the best destination and the best path for the second region.

In some implementations, receiving the additional performance metrics associated with the multiple paths in the second region to the destination addresses includes determining whether the service and the second region are identified in the MFPS lookup table, and receiving the additional performance metrics associated with the multiple paths in the second region to the destination addresses, based on the second region not being identified in the MFPS lookup table.

In some implementations, process 500 includes determining that the best destination or the best path for the second region is unavailable, and causing, for the other endpoint device, the other connection to the service to be established via the next best destination and the next best path for the second region based on determining that the best destination or the best path for the second region is unavailable.

In some implementations, process 500 includes receiving updated additional performance metrics associated with the multiple paths in the first region after a predetermined time period.

In some implementations, process 500 includes determining that the best destination or the best path for the first region is unavailable, and causing, for the endpoint device, a connection to the service to be established via the next best destination and the next best path for the first region based on determining that the best destination or the best path for the first region is unavailable.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device, a request for a service from an endpoint device located in a first region;
   determining, by the network device, whether destination addresses are identified for the service and the first region;
   receiving, by the network device, the destination addresses associated with the service and the first region from a domain name system (DNS) server device when the destination addresses are not identified;
   determining, by the network device, whether the service and the first region are identified in a multifactor path selection (MFPS) lookup table, based on the destination addresses being identified for the service and the first region;
   receiving, by the network device, performance metrics associated with multiple paths in the first region to the destination addresses, based on the service and the first region not being identified in the MFPS lookup table;
   generating, by the network device, a performance metrics matrix based on the performance metrics;
   identifying, by the network device, a best destination and a best path, and a next best destination and a next best path, for the service in the first region based on the performance metrics matrix,
      wherein identifying the best destination and the best path comprises:
         ranking availabilities in the performance metrics matrix to determine highest availabilities of available paths and available destinations, and
            determining that a particular path in the first region to a particular destination is the best path and the best destination based on the highest availabilities;
   providing, by the network device, data identifying the best destination, the best path, the next best destination, and the next best path, for the first region, in the MFPS lookup table; and
   causing, by the network device and for the endpoint device, a connection to the service to be established via the best destination and the best path for the first region.

2. The method of claim 1, further comprising:
   requesting, from the DNS server device, the destination addresses based on the destination addresses not being identified for the service or the first region.

3. The method of claim 1, wherein receiving the performance metrics associated with the multiple paths in the first region to the destination addresses comprises:
   requesting the performance metrics from one or more of a plurality of server devices; and
   receiving the performance metrics from the one or more of the plurality of server devices based on requesting the performance metrics.

4. The method of claim 1, further comprising:
   receiving updated performance metrics associated with the multiple paths in the first region after a predetermined time period.

5. The method of claim 1, further comprising:
   receiving another request for the service from another endpoint device located in the first region;
   identifying the best destination and the best path for the service in the first region from the MFPS lookup table; and
   causing, for the other endpoint device, another connection to the service to be established via the best destination and the best path for the first region.

6. The method of claim 5, wherein identifying the best destination and the best path for the service in the first region from the MFPS lookup table comprises:
   determining whether the service and the first region are identified in the MFPS lookup table; and
   identifying the best destination and the best path for the service in the first region from the MFPS lookup table, based on the service and the first region being identified in the MFPS lookup table.

7. The method of claim 1, wherein the network device is a web gateway.

8. A network device, comprising:
   one or more memories; and
   one or more processors to:
      receive a request for a service from an endpoint device located in a first region;
      determine whether destination addresses are identified for the service and the first region;
      receive the destination addresses associated with the service and the first region from a domain name system (DNS) server device when the destination addresses are not identified;
      determine whether the service and the first region are identified in a multifactor path selection (MFPS) lookup table, based on the destination addresses being identified for the service and the first region;
      receive performance metrics associated with multiple paths in the first region to the destination addresses, based on the service and the first region not being identified in the MFPS lookup table;
      generate a performance metrics matrix based on the performance metrics;
      identify a best destination and a best path, and a next best destination and a next best path, for the service in the first region based on the performance metrics matrix,
         wherein the one or more processors, to identify the best destination and the best path, are to:
            rank availabilities in the performance metrics matrix to determine highest availabilities of available paths and available destinations, and
            determine that a particular path in the first region to a particular destination is the best path and the best destination based on the highest availabilities; and
      provide data identifying the best destination, the best path, the next best destination, and the next best path, for the first region, in the MFPS lookup table.

9. The network device of claim 8, wherein the one or more processors are further to:
   receive another request for the service from another endpoint device located in a second region that is separate from the first region;
   receive additional performance metrics associated with multiple paths in the second region to the destination addresses based on the second region not being identified in the MFPS lookup table;

modify the performance metrics matrix based on the additional performance metrics to generate a modified performance metrics matrix;
identify a best destination and a best path, and a next best destination and a next best path, for the service in the second region, based on the modified performance metrics matrix; and
provide data identifying the best destination, the best path, the next best destination, and the next best path, for the second region, in the MFPS lookup table.

10. The network device of claim 9, wherein the one or more processors are further to:
cause, for the other endpoint device, another connection to the service to be established via the best destination and the best path for the second region.

11. The network device of claim 9, wherein the one or more processors, to receive the additional performance metrics associated with the multiple paths in the second region to the destination addresses, are to:
determine whether the service and the second region are identified in the MFPS lookup table; and
receive the additional performance metrics associated with the multiple paths in the second region to the destination addresses, based on the second region not being identified in the MFPS lookup table.

12. The network device of claim 9, wherein the one or more processors are further to:
determine that the best destination or the best path for the second region is unavailable; and
cause, for the other endpoint device, the other connection to the service to be established via the next best destination and the next best path for the second region based on determining that the best destination or the best path for the second region is unavailable.

13. The network device of claim 9, wherein the one or more processors are further to:
receive updated additional performance metrics associated with the multiple paths in the first region after a predetermined time period.

14. The network device of claim 8, wherein the one or more processors are further to:
determine that the best destination or the best path for the first region is unavailable; and
cause, for the endpoint device, a connection to the service to be established via the next best destination and the next best path for the first region based on determining that the best destination or the best path for the first region is unavailable.

15. A non-transitory computer-readable medium storing a set of instructions, the set of instructions comprising:
one or more instructions that, when executed by one or more processors of a network device, cause the network device to:
receive a request for a service from an endpoint device located in a first region;
determine whether destination addresses are identified for the service and the first region;
receive the destination addresses associated with the service and the first region from a domain name system (DNS) server device when the destination addresses are not identified;
determine whether the service and the first region are identified in a multifactor path selection (MFPS) lookup table, based on the destination addresses being identified for the service and the first region;
receive performance metrics associated with multiple paths in the first region to the destination addresses, based on the service and the first region not being identified in the MFPS lookup table;
generate a performance metrics matrix based on the performance metrics;
identify a best destination and a best path, and a next best destination and a next best path, for the service in the first region based on the performance metrics matrix,
wherein the one or more instructions, that cause the network device to identify the best destination and the best path for the service, cause the network device to:
rank availabilities in the performance metrics matrix to determine highest availabilities of available paths and available destinations, and
determine that a particular path in the first region to a particular destination is the best path and the best destination based on the highest availabilities;
provide data identifying the best destination, the best path, the next best destination, and the next best path, for the first region, in the MFPS lookup table;
determine that the best destination or the best path for the first region is unavailable; and
cause, for the endpoint device, a connection to the service to be established via the next best destination and the next best path for the first region based on determining that the best destination or the best path for the first region is unavailable.

16. The non-transitory computer-readable medium of claim 15, wherein the one or more instructions further cause the network device to:
request, from the DNS server device, the destination addresses based on the destination addresses not being identified for the service or the first region.

17. The non-transitory computer-readable medium of claim 15, wherein the one or more instructions further cause the network device to:
receive updated performance metrics associated with the multiple paths in the first region after a predetermined time period.

18. The non-transitory computer-readable medium of claim 15, wherein the one or more instructions further cause the network device to:
receive another request for the service from another endpoint device located in the first region;
identify the best destination and the best path for the service in the first region from the MFPS lookup table; and
cause, for the other endpoint device, another connection to the service to be established via the best destination and the best path for the first region.

19. The non-transitory computer-readable medium of claim 18, wherein the one or more instructions, that cause the network device to identify the best destination and the best path for the service in the first region from the MFPS lookup table, cause the network device to:
determine whether the service and the first region are identified in the MFPS lookup table; and
identify the best destination and the best path for the service in the first region from the MFPS lookup table, based on the service and the first region being identified in the MFPS lookup table.

20. The non-transitory computer-readable medium of claim 15, wherein the one or more instructions further cause the network device to:

receive another request for the service from another endpoint device located in a second region that is separate from the first region;

receive additional performance metrics associated with multiple paths in the second region to the destination addresses based on the second region not being identified in the MFPS lookup table;

modify the performance metrics matrix based on the additional performance metrics to generate a modified performance metrics matrix;

identify a best destination and a best path, and a next best destination and a next best path, for the service in the second region, based on the modified performance metrics matrix;

provide data identifying the best destination, the best path, the next best destination, and the next best path, for the second region, in the MFPS lookup table; and cause, for the other endpoint device, another connection to the service to be established via the best destination and the best path for the second region.

* * * * *